April 5, 1960   H. EBERT   2,931,250
HYDROSTATIC TRANSMISSION
Filed May 21, 1956   4 Sheets-Sheet 1

INVENTOR
Heinrich Ebert
By

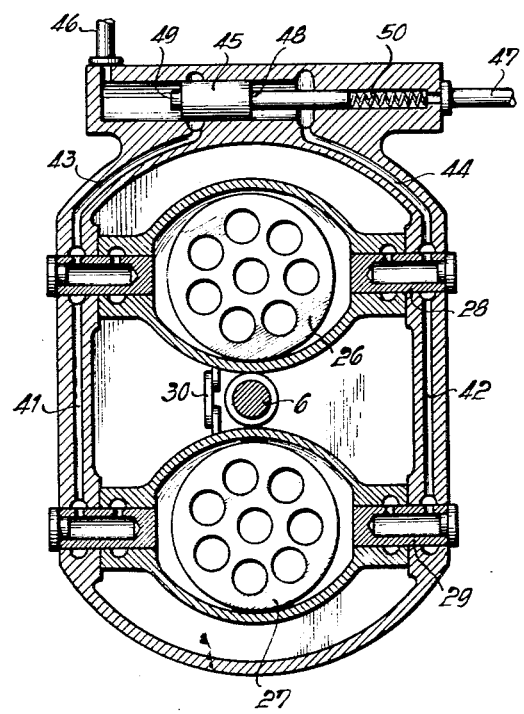

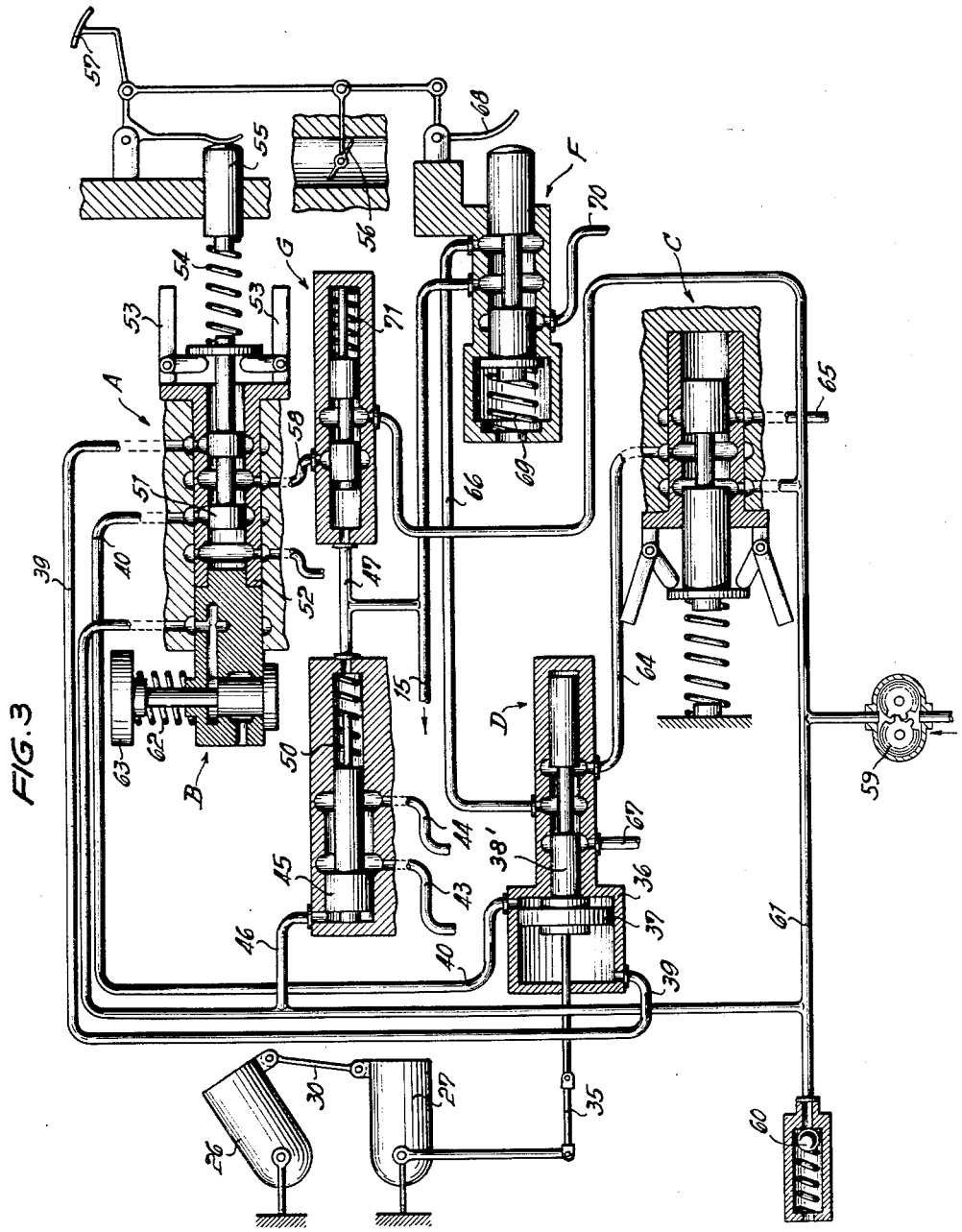

April 5, 1960 H. EBERT 2,931,250
HYDROSTATIC TRANSMISSION
Filed May 21, 1956 4 Sheets-Sheet 4
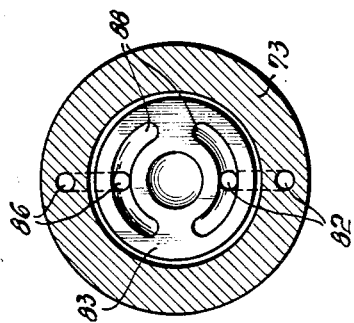
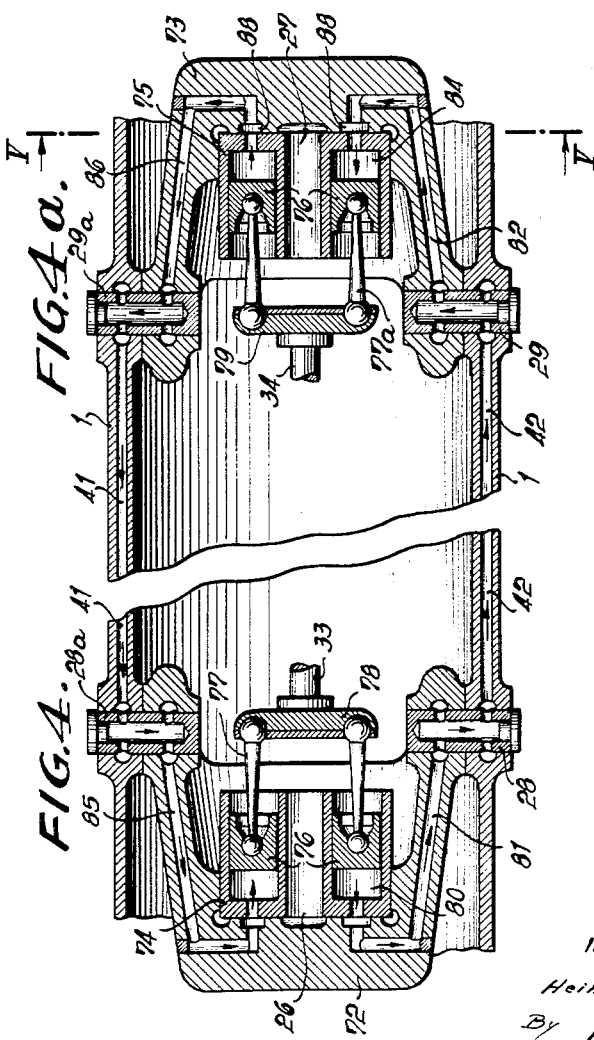
INVENTOR
Heinrich Ebert
By
Patent Agent United States Patent Office 2,931,250
Patented Apr. 5, 1960

2,931,250

HYDROSTATIC TRANSMISSION

Heinrich Ebert, Furth, Bavaria, Germany

Application May 21, 1956, Serial No. 586,316

Claims priority, application Germany May 23, 1955

8 Claims. (Cl. 74—687)

The present invention relates to a hydrostatic transmission with infinitely variable stepdown ratio, especially for motor vehicles.

With hydrostatic transmissions of the type to which the present invention relates, the input power is distributed by a planetary gear transmission over a hydraulic transmission branch and a mechanical transmission branch. The hydraulic transmission branch leads from the planetary gear transmission through a hydrostatic transmission to the output shaft, said hydrostatic transmission comprising a pump and a motor with mutually interconnected pressure and suction chambers. The mechanical transmission branch leads directly from the planetary gear transmission to the output shaft.

When employing transmissions of the above mentioned type for driving motor vehicles, one of the main operational stages of the transmission is the operational stage at a stepdown transmission of 1:1 at which the input shaft and the output shaft rotate at the same speed of rotation. It is for this reason that the planetary gear transmission and the hydrostatic transmission are in most instances so dimensioned that at a stepdown transmission ratio of 1:1, the entire input is transmitted purely mechanically while no power is transmitted through the hydraulic transmission branch. In this instance no fluid circulation is effected in the hydraulic transmission.

However, even at this stage of operation, the cylinder chambers of the hydrostatic transmission and its pressure conduits are under full pressure. Consequently, also at this transmission stage, leakage losses and friction losses in the bearings appear as well as a certain wear of the bearings. Furthermore, the gears of the planetary gear transmission rotate under load.

It is, therefore, an object of the present invention to provide a hydrostatic transmission of the above mentioned type in which practically no loss due to leakage will occur when no liquid circulation takes place.

It is another object of this invention to provide a hydrostatic transmission of the above mentioned type in which the gear noise of the planetary gear transmission will be considerably reduced.

These and other objects and advantages of the present invention will appear more clearly from the following specification in connection with the accompanying drawings, in which:

Fig. 2 is a section taken along the line II—II of Fig. 1.

Figure 1:
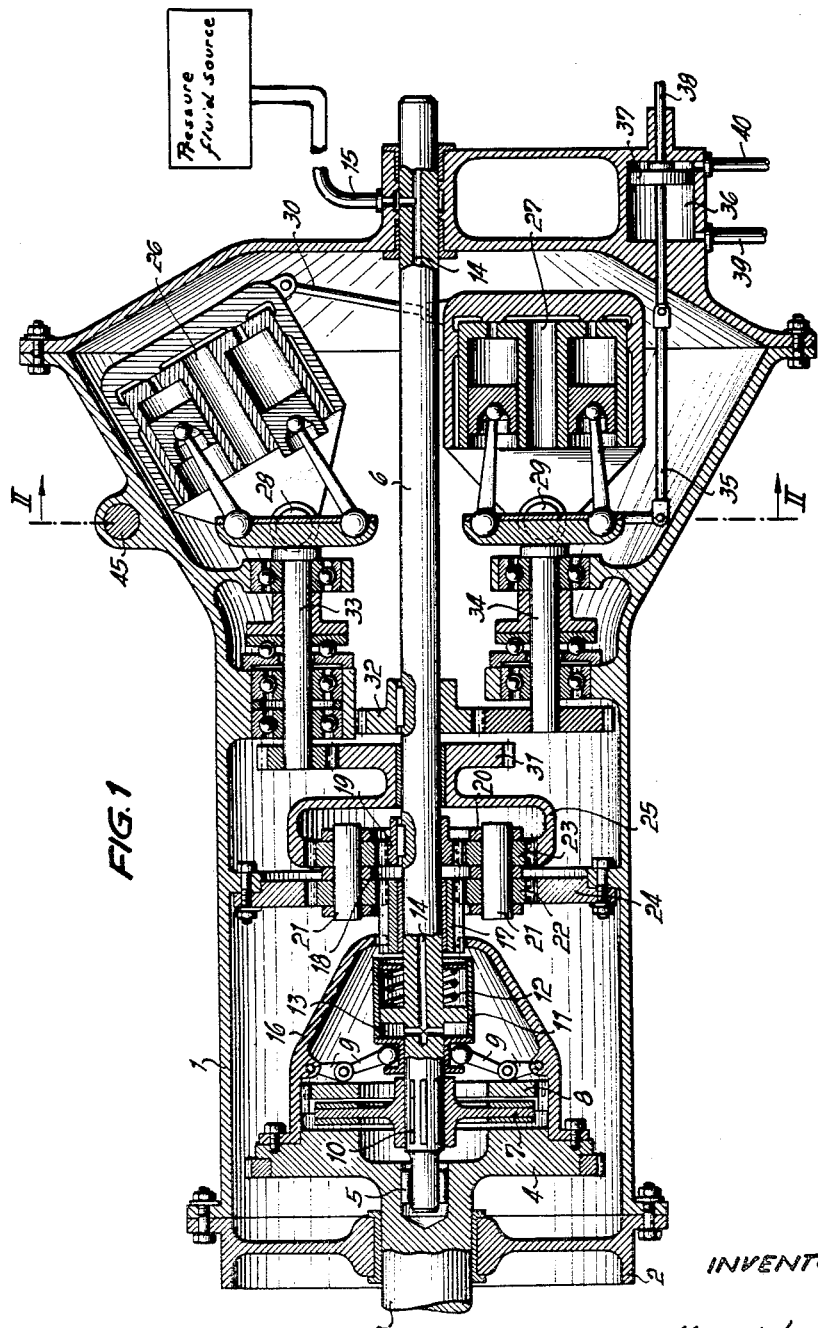
Fig. 1 is an axial section through a hydrostatic transmission with planetary gear transmission and mechanical clutch in conformity with the present invention.

Fig. 3 diagrammatically illustrates a control circuit for use in connection with the present invention.

Fig. 4 is a section taken along the line IV—IV of Fig. 1 and Fig. 2.

Fig. 4a is a section taken along the line IVa—IVa of Fig. 1 and Fig. 2.

Fig. 5 is a section taken along the line V—V of Fig. 4.

*General arrangement*

According to the present invention, a shiftable mechanical clutch is provided for connecting the transmission input shaft with the transmission output shaft. In addition thereto, a valve is provided which, when the clutch is effective, connects the pressure side of the transmission with the suction side of the transmission by being coupled to the mechanism for actuating the clutch. Due to the automatic coupling of the valve which establishes communication between the pressure and suction side of the transmission, with the means for actuating the clutch, the mechanical clutch can be made effective only when the hydraulic power transmission is interrupted. At the same time, an unintentional interruption in the power transmission by prematurely opening the valve or disengaging the mechanical clutch will be prevented.

The bridging of hydromatic couplings or convertors by means of mechanical clutches and also the control of such clutches by governors is well known.

In conformity with a very advantageous embodiment of the invention, the mechanical clutch is actuated hydraulically. A piston slide or spool may serve as valve for connecting the transmission pressure side with the transmission suction side, said piston slide being adapted to be actuated by pressure in the actuating conduit for the clutch.

In order to prevent the clutch from being made effective at another transmission ratio than 1:1, according to the present invention it is suggested to employ a hydraulic adjustment of the transmission ratio by a centrifugal governor having a rated speed adjustable at random which is driven at a speed proportional to the engine speed, and to couple the adjusting piston for the transmission step down ratio with a control valve which establishes communication between a pressure source on one hand and the mechanism for actuating the clutch and the pressure chamber of the piston valve on the other hand only when the piston occupies a position for the smallest transmission ratio 1:1. On the other hand, said control valve connects the conduit for actuating the clutch and the pressure chamber with an exhaust return conduit at any other position of the transmission.

In further developing the invention, the piston slide is adapted to be actuated by a governing pressure against the thrust of a spring and against the pressure in the conduits for actuating the clutch. The said governing pressure is controlled by a centrifugal valve and increases with the increase in the motor speed. The spring and the differential surfaces of the piston slide or spool, which are actuated by the pressure of the centrifugal pressure valve and by the pressure of the pressure side of the transmission respectively are in a manner known per se so dimensioned that at a small opened throttle position of the engine accelerator the said piston slide interrupts communication between the pressure side of the transmission and the suction side thereof already at low engine speed, whereas at a wide open throttle position of the engine accelerator, this interruption is effected only at a higher speed of the engine. In any way, at idling speed of the motor, the piston slide or spool establishes communication between the pressure side of the transmission and the suction side thereof. In this way, when the engine is idling, the hydrostatic transmission is declutched without additional actuation of an additional clutch. Due to the fact that in this condition the mechanical clutch is likewise open, the entire transmission does not transfer any torque thereby permitting the running of the engine while the vehicle is at a standstill.

The throwing in of the mechanical clutch, and the connection between the pressure and suction side of the transmission is furthermore controlled, according to the present invention, additional to the control valve coupled to the adjusting piston for the transmission, by a centrifugal governor which is driven at a speed proportional to the transmission output speed. The said centrifugal governor is arranged between the pressure source and the control valve coupled to the adjusting piston of the transmission. This centrifugal governor is adjusted for a fixed speed in such a manner that the passage for the pressure fluid is only open in a certain speed range of the vehicle in which at a transmission ratio of 1:1 the mechanical clutch should be effective. Below the said speed, the centrifugal governor establishes communication between the conduit leading to the control valve and a return exhaust valve in which no pressure prevails. This arrangement makes it impossible to drive at too low a vehicle speed (in a 1:1 ratio) and prevents too low engine speeds in a 1:1 ratio, thereby automatizing once more the entire transmission control.

At a 1:1 ratio, while the mechanical clutch is effective, it is furthermore desirable, for the purpose of overtaking another vehicle, to increase the transmission ratio, that means to increase the motor speed and to obtain in this way an increased acceleration torque for the vehicle. To this end, according to the present invention, a further control valve is arranged between the control valve coupled to the transmission adjusting piston and the conduit for actuating the clutch. This additional control valve establishes in a first position communication between the pressure fluid coming from the control valve coupled to the adjusting piston of the transmission on one hand and the mechanism for actuating the clutch and the pressure chamber of the piston valve on the other hand. In a second position, said control valve connects the conduit for actuating the clutch and the pressure chamber with an exhaust return conduit. This control valve is furthermore adapted to be actuated against the thrust of a spring and may, for instance, be connected with the accelerator of the vehicle in such a way that when the accelerator reaches a certain position shortly before its full load position, a further depression of the accelerator against the sensible thrust of the spring of the control valve brings about the desired disconnection of the mechanical clutch while the higher step down transmission ratio in the hydrostatic transmission is made effective.

In conformity with the present invention, between the pressure source and the supply conduit to the centrifugal speed governor for adjusting the transmission ratio, a piston slide or spool may be provided which is adapted to be actuated by the pressure in the conduit for actuating the clutch against the thrust of a spring. The piston slide or spool makes the automatic adjustment of the step down transmission ratio ineffective as soon as the mechanical cultch is thrown in and the hydrostatic transmission is made ineffective.

*Structural arrangement*

Referring now to the drawings in detail, the transmission casing 1 is flanged to the housing 2 of the vehicle engine. As will be evident from Fig. 1, the motor crankshawt 3 with flywheel 4 extends from the motor housing 2 into the transmission casing 1. The output shaft 6 of the transmission is journalled in bearings 5 in the crankshaft 3. For direct connection of the crankshaft 3 with the output shaft 6 there is provided a friction clutch which comprises the clutch disc 7, the ring 8, and the clutch levers 9. The clutch disc 7 is journalled on the output shaft by means of a splined section 10. The clutch is made effective or ineffective by means of a hydraulic cylinder 11 which by admitting pressure fluid into the cylinder chamber 13 is adapted to be moved toward the left against the thrust of spring 12 tending to disengage the clutch. The supply of pressure fluid into the cylinder chamber 13 is effected through a bore 14 in the output shaft 6 and a conduit 15 connected to the right-hand bearing of said shaft with regard to Fig. 1. The crankshaft 3 through the intervention of the dome 16 drives one sun wheel 17 rotatably journalled on the output shaft 6 and pertaining to the planetary gear transmission 18. The other sun wheel 19 of said planetary gear transmission is keyed to the output shaft 6. The axles 21 of the planetary gears 22 and 23 are journalled in a planetary gear carrier 20. The planetary gears 22 mesh with the sun wheel 17 and a stationary interior gearing 24 which is fixedly mounted in the transmission casing 1. The planetary gears 23 mesh with the interior teeth of a dome-shaped structure 25 and with the sun wheel 19.

The transmission casing houses two hydraulic axial piston units 26 and 27. For purpose of changing the transmission step down ratio, the two units are tiltably journalled about the studs 28 and 29. The control surfaces 83 of these axial piston hydraulic units are in a manner known per se provided with kidney-shaped control grooves 88. The two tilting frames are interconnected by a connecting rod 30 in such a way that each time one hydraulic unit will have its maximum tilting angle, when the other hydraulic unit has the tilting angle zero, and vice versa. The hydraulic unit 26 is driven by a gear 31 connected to the structural member 25. The hydraulic unit 27 is driven by a gear 32 connected to the output shaft 6. The absorption of the axial and radial loads of the shafts 33 and 34 pertaining to the hydraulic units 26 and 27 respectively is effected in the illustrated embodiment by axial and radial anti-friction bearings not specifically named in the drawing. However, if desired for the same purpose also tiltable or stationary counter drums may be employed.

The adjustment of the two hydraulic units 26 and 27 by means of tilting the two tiltable frames, is effected through the intervention of a connecting rod 35 by means of a piston 37 which is displaceably mounted in a cylinder 36. The piston rod 38 is extended toward the right with regard to Fig. 1 and forms a valve spool as will be seen from Fig. 3. The two cylinder chambers of the piston 37 communicate with the fluid conduits 39 and 40.

Fig. 2 particularly illustrates the design of the tilting pivots 28 and 29 in form of fluid conduits for the pressure and suction sides of the two hydrostatic units 26 and 27. The pressure and suction sides communicate with each other through conduits 41 and 42 and through conduits 43 and 44 in transmission casing 1 when the piston or control valve spool 45 has moved to its left hand end position with regard to Fig. 2. In other words, in this position communication between the pressure and the suction side of the transmission is established. The piston control valve 45 is designed as a differential valve. Its left surface 49 which is actuated by pressure in conduit 46 is larger than the annular surface 48 actuated by the pressure of the transmission pressure side 44. The piston control valve 45 additionally is subjected to the pressure in a conduit 47 and to the force of the spring 50.

The adjusting piston 37 and the conduits 39 and 40 leading into the cylinder 36 will be clearly seen from Fig. 3. Fig. 3 also illustrates the conduit 15 of Fig. 1, the control piston valve 45 and the conduits 46 and 47. The conduits 15 and 47 communicate with each other.

The speed governor which brings about the automatic adjustment of the transmission step down ratio is generally designated with the reference numeral A. The governor A comprises a control spool 51, a control bushing 52, the centrifugal weight 53, the counter spring 54 and the adjustment spring bearing 55. The adjustment of the rated speed of the centrifugal governor A by adjusting the spring bearing 55 is effected automatically together with the movement of the gas pedal 57 which actuates the choke 56. The two conduits 39 and 40 lead from the speed governor A to the two cylinder chambers of the control piston 37. At too low a speed of the vehicle engine, the control spool 51 is pressed toward the left by the counter spring 54 and connects the conduit 40 with the pressure supply line 58 of the speed governor A. As a result thereof, the piston 37 is moved toward the left and increases the transmission step down ratio. In an inverse manner, when exceeding the adjusted rated speed of the speed governor A, the conduit 39 is connected with the conduit 58, and the piston 37 is moved toward the right. In each instance, that side of the piston 37 which is not acted upon by fluid is relieved by the speed governor A. The entire control device is supplied with pressure fluid by a gear pump 59 by overflow valve 60. The pressure in the conduit 61 supplied by the gear pump 59 is controlled by the centrifugal pressure valve B of conventional design. This centrifugal force pressure valve will, even at the speed zero, adjust a pressure in the conduit 61 due to the centrifugal force created during the rotation of the centrifugal weight 63 and due to the spring, even at the speed zero. The said pressure in conduit 61 will suffice to bring about a change in the transmission step down ratio through the intervention of the piston 37.

A centrifugal governor C is interposed in the feeding conduit leading from the gear pump 59 to the conduits 15 and 47. The construction of the governor C fully corresponds to that of the speed governor A. However, the governor C is adjusted for a fixed rated speed. This governor opens the passage from conduit 61 to conduit 64 when a certain driving speed is exceeded. At lower speed the conduit 64 is relieved into the exhaust return conduit 65. Furthermore, a control valve D is interposed in the feeding conduit which valve D has its valve spool fixedly connected with the adjusting piston 37. The control valve D opens the passage from the conduit 64 into the conduit 66 only when the adjusting piston 37 occupies the position corresponding to the transmission ratio 1:1. With each other adjustment, the conduit 66 is relieved into the exhaust 67.

Still another control valve, namely the valve F is interposed between the conduit 66 and the conduits 15 and 47. This valve F is adapted to be moved into closing position by means of a lever 68 against the thrust of a spring 69. In its closing position, the valve F establishes communication between the conduits 15 and 47 on one hand and an exhaust return conduit 70. The lever 68 is connected with the accelerator 57 in such a way that it will close the control valve F shortly before reaching its full load position.

Furthermore, a piston valve G is connected to the conduits 47 and 15. This piston valve establishes a communication between the gear pump 59 and the feeding conduit 58 leading to the speed governor A when the conduits 15 and 47 are under no pressure. When the conduits 15 and 47 are under pressure, the valve spool of the valve G is displaced toward the right (with regard to Fig. 3) against the thrust of spring 71, thereby interrupting communication between the gear pump 59 and the conduit 58.

Referring now to Fig. 4, the tiltable bodies 72 and 73 of the hydrostatic aggregates 26 and 27 have rotatably journalled therein cylindrical drums 74 and 75 provided with bores 80 and 84 in which pistons 76 and 76a are respectively reciprocably mounted. The said pistons are respectively connected through connecting rods 77 and 77a with discs 78 and 79 respectively rotatably connected to the shafts 33 and 34.

When for instance the aggregate 26 works as pump while the aggregate 27 works as motor, the liquid from the pressure chambers on the left-hand side of the piston 76 (with regard to Fig. 4) is pressed into the conduit 81 in the tiltable body 72 and from there passes through the hollow stud or pivot 28 into the connecting line 42 which extends in the wall of the transmission casing 1 and establishes the connection with the stud or pivot 29. From the pivot 29, the fluid passes into the aggregate 27 (Fig. 4a) and through conduit 82 in the tiltable body 73 is passed into the chamber on the right-hand side of the piston 76a (with regard to Fig. 4a). At the suction side, the connection is established in similar manner through the conduit 85, the hollow pivot 28a, the conduit 41, the hollow pivot 29a and the conduit 86.

Fig. 5 is a section through the tiltable body 73 and shows the control level 83 with the kidney-shaped control grooves 88 which establish communication between the individual bores of the drum 85 passing by said bores, and the conduit 82 and 86 respectively in the tiltable body 73.

*Operation*

The operation of the device is as follows: When in its starting position while the vehicle engine is idling, the rated speed of the speed governor A is higher than the motor speed. The control valve 51 occupies its left hand position so that the conduit 40 communicates with the conduit 58, while the adjusting piston 37 occupies its left hand position corresponding to the highest step down ratio of the transmission. The centrifugal pressure in the centrifugal pressure valve B adjusts the arrangement for such a low pressure in the conduit 61 that the spool 45 is pressed by means of its spring 50 into the position shown in Fig. 3 thereby establishing communication between the pressure and the suction side of the transmission. Thus, the vehicle is at a standstill. Consequently, the spool of the centrifugal valve C occupies its right hand position and prevents a transmission of the pressure in the conduit 61 to the conduit 64 and therefore also to the conduit 15 governing the actuation of the clutch and the conduit 47. On the other hand, conduit 61 communicates with the feeding conduit 58 of the speed governor A because the spool of the valve G occupies its left hand end position. Inasmuch as no pressure prevails in conduit 15, the mechanical clutch 7, 8, 9 (see Fig. 1) is open. The spool or valve F, thereby, occupies the position shown in Fig. 3.

When depressing the accelerator, the pressure adjusted or governed by the centrifugal pressure valve B is conduit 61 increases and the spool 45 is displaced more and more toward the right whereby the flow of fluid between the pressure and suction side of the hydrostatic transmission is throttled more and more. Consequently, the vehicle begins to move. With increasing driving speed, while for the time being the maximum step down ratio of the hydrostatic transmission is maintained, the speed of the driving engine increases so that the spool 51 of the speed governor A is displaced toward the right and causes a movement of the adjusting piston 37 toward a smaller step down ratio, that means toward the ratio 1:1 between input and output shaft. When the limit speed of the speed governor C has been obtained, the spool of the governor or valve C establishes communication between conduit 61 and conduit 64. If now by further depressing the accelerator, the vehicle is brought up to such a speed that the hydrostatic transmission has its transmission ratio changed to 1:1 or if by suddenly taking the foot off the gas pedal, the rated speed of the speed governor A is reduced below the effective speed, the adjusting piston 37 and consequently also the spool of the valve D move into the position shown in the drawing whereby communication is established between the conduit 64 and the conduits 66, 15, and 47. As a result thereof, since conduit 15 communicates through conduit 14 (Fig. 1) with the clutch actuating cylinder piston system 11, 13, the mechanical clutch 7, 8, 9 is made effective, and the power transfer in the hydrostatic transmission is interrupted by movement of the spool 45 toward the left. At the same time, the spool of the valve G is moved toward the right thereby making the automatic adjustment of the transmission ratio ineffective. The driving engine is, therefore, mechanically coupled to the vehicle at a transmission ratio of 1:1 and works similar to an ordinary mechanical transmisison within a wide speed range.

If the vehicle with the engine mechanically coupled in the above manner drives up an incline and loses so much of its speed that the speed drops below the limit speed at which the speed governor or valve spool C is moved by the spring toward the right side position, the conduits 64, 15, and 47 will communicate with the exhaust return 65. Consequently, the mechanical clutch is disengaged, and, due to the displacement of the spool 45 toward the right, the hydrostatic transmission is made effective. At the same time, the supply of fluid to conduit 58 is opened up, and the automatic adjustment of the transmission ratio becomes effective. The infinitely variable, and in the specific embodiment shown, automatically controlled hydrostatic transmisison becomes again fully effective.

The shifting of the mechanical clutch for hydrostatic power transmisison may also at random be brought about by the driver by depressing the accelerator 57 further downwardly. In such an instance, the spool of the valve F is moved toward the left so that the conduits 15, 47 will communicate with the exhaust return 70 and no pressure will prevail in the conduits 15 and 47.

Summarizing the operation of the device according to the present invention, it may be stated that the following advantages are obtained:

(a) The mechanical clutch is automatically made effectice while simultaneously the power flow in the hydrostatic transmisison is interrupted.

(b) The mechanical clutch is made effective only after the transmission ratio 1:1 has been established in the hydrostatic transmisison and when a certain driving speed has been exceeded.

(c) The automatic adjustment for the transmission step down ratio may selectively be made ineffective.

(d) The mechanical clutch is automatically made ineffective while simultaneously the hydrostatic power transmission and the automatic adjustment for the step down ratio is made effective not only when the speed of the output shaft drops below a certain speed, i.e. in the case when the engine speed drops below a certain speed, but also for purposes of obtaining a sudden increase in acceleration, for instance, when overtaking another vehicle. This is effected by depressing the gas pedal beyond a certain point.

It is, of course, understood, that the present invention, is by no means, limited to the specific construction shown in the drawing but also comprises any modification within the scope of the appended claims.

What I claim is:

1. In combination in a hydrostatic transmission with infinitely variable transmission ratio for motor vehicles, which includes an input shaft and an output shaft: two hydraulic units each having pressure and suction conduit means, said pressure conduit means being interconnected and said suction conduit means being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, actuating means for making said clutch effective, valve means interposed between said pressure and suction conduit means for selectively interconnecting the same, and means operatively connected to said actuating means for causing said valve means to interconnect said suction and pressure conduit means while said mechanical clutch is being made effective.

2. In combination in a hydrostatic transmission with infinitely variable transmission ratio for motor vehicles, which includes an input shaft and an output shaft: two hydraulic units each having two chambers respectively alternately acting as pressure and suction chambers, the respective chambers acting as pressure chamber being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, a fluid operable cylinder piston system for actuating said clutch, valve means interposed between the respective pressure and suction chambers and movable into a first position for interconnecting the respective pressure chambers and for interconnecting the respective suction chambers and into a second position for interrupting communication between the respective pressure chambers and between the respective suction chambers, fluid operable actuating means connected to said valve means for moving the same into said first position, and conduit means establishing fluid communication between said fluid operable actuating means and said cylinder piston system, whereby in response to a certain pressure acting on said fluid operable actuating means said valve means is moved into said first position to establish communication between the respective pressure chambers and the respective suction chambers while said cylinder piston system makes the mechanical clutch effective for direct transfer of power from said input shaft to said output shaft.

3. In combination in a hydrostatic transmission with infinitely variable transmission ratio, which includes a centrifugal governor with adjustable rated speed for controlling a hydraulic adjusting mechanism for adjusting said transmission ratio: an input shaft, an output shaft, two hydraulic units each having two chambers respectively alternately acting as pressure and suction chamber, the respective chambers acting as pressure chambers being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, actuating means for making said clutch effective, valve means interposed between the respective pressure and suction chambers for selectively interconnecting the same, means operatively connected to said actuating means for causing said valve means to interconnect said suction chambers and to interconnect said pressure chambers while said mechanical clutch is being made effective, a fluid operable control valve connected to said transmission ratio adjusting mechanism for connecting said actuating means with a fluid source when said adjusting mechanism is adjusted for the smallest step down transmission ratio 1:1 and for effecting communication between said fluid source and said actuating means, and conduit means communicating with an exhaust and with said control valve means for connecting said actuating means and said first mentioned valve means with said conduit means in response to said transmission ratio adjusting mechanism moving from its position corresponding to said lowest step down transmission ratio into a position for establishing a higher step down transmission ratio.

4. In combination in a hydrostatic transmission with infinitely variable transmission ratio for motor vehicles, which includes an input shaft and an output shaft: two hydraulic units each having two chambers respectively alternately acting as pressure and suction chambers, the respective chambers acting as pressure chamber being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, a fluid operable cylinder piston system for engaging said clutch means with each other, valve means interposed between the respective pressure and suction chambers and movable into a first position for connecting the respective pressure chambers with the respective suction chambers and into a second position for interrupting communication between the respective pressure chambers and the respective suction chambers, said valve means including a differential piston, spring means acting on the smaller surface area of said differential piston and continuously urging said valve means into said first position, a centrifugal pressure valve controlling the flow of actuating pressure fluid to the larger surface area of said differential piston in conformity with the speed of a vehicle equipped with said hydrostatic transmission, fluid operable actuating means communicating with the smaller surface area of said differential piston, and conduit means establishing fluid communication between said fluid operable actuating means and said cylinder piston system, the differential surface areas of said differential piston being so dimensioned that at idling speed of the vehicle engine said differential piston occupies said first position.

5. In combination in a hydrostatic transmission with infinitely variable transmission ratio, which includes a centrifugal governor with adjustable rated speed for controlling a hydraulic adjusting mechanism for adjusting said transmission ratio: an input shaft, an output shaft, two hydraulic units each having two chambers respectively alternately acting as pressure and suction chamber, the respective chambers acting as pressure chambers being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, actuating means operable to bring said first and second clutch means into engagement with each other, valve means interposed between the respective pressure and suction chambers and for selectively interconnecting the respective suction chambers, means operatively connected to said actuating means for causing said valve means to interconnect the respective suction chambers and the respective pressure chambers while said mechanical clutch is being made effective, a pressure fluid source, a fluid operable control valve connected to said transmission ratio adjusting mechanism for connecting said actuating means with said fluid source when said adjusting mechanism is adjusted for the smallest step down transmission ratio 1:1 and for effecting communication between said fluid source and said first mentioned valve means, and an additional centrifugal governor arranged between said pressure fluid source and said fluid operable control valve, said additional centrifugal governor including control means for controlling the flow of fluid from said pressure fluid source to said fluid operable control valve, the control means of said additional centrifugal governor being movable in response to a certain speed of the output shaft into a first position for admitting pressure fluid from said pressure fluid source through said fluid operable control valve to said actuating means and being movable into another position in response to a speed lower than said certain speed of said output shaft for establishing communication between said fluid operable control valve and an exhaust.

6. In combination in a hydrostatic transmission with infinitely variable transmission ratio, which includes a centrifugal governor with adjustable rated speed for controlling a hydraulic adjusting mechanism for adjusting said transmission ratio: an input shaft, an output shaft, two hydraulic units each having two chambers respectively alternately acting as pressure and suction chamber, the respective chambers acting as pressure chambers being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, actuating means operable to bring said first and second clutch means into engagement with each other, valve means interposed between the respective pressure chambers and between the respective suction chambers for selectively interconnecting the same, means operatively connected to said actuating means for causing said valve means to interconnect the respective suction chambers and to interconnect the respective pressure chambers while said mechanical clutch is being made effective, a pressure fluid source, a fluid operable first control valve connected to said transmission ratio adjusting mechanism for connecting said actuating means with said fluid source when said adjusting mechanism is adjusted for the smallest step down transmission ratio 1:1 and for effecting communication between said fluid source and said first mentioned valve means, an additional centrifugal governor arranged between said pressure fluid source and said fluid operable first control valve, said additional centrifugal governor including control means for controlling the flow of fluid from said pressure fluid source to said fluid operable first control valve, said additional centrifugal governor being movable in response to a certain speed of the output shaft into a first position for admitting pressure fluid from said pressure fluid source through said fluid operable first control valve to said actuating means and being movable into an other position in response to a speed lower than said certain speed of said output shaft for establishing communication between said fluid operable control valve and an exhaust, and a second control valve interposed between said first control valve and said clutch actuating means and movable into a first position for connecting said fluid operable control valve with said actuating means or into a second position for connecting said clutch actuating means with an exhaust.

7. A hydrostatic transmission according to claim 6 in combination with an internal combustion engine, which includes an accelerator governing the supply of fuel to said engine, and in which said accelerator is connected with said second control valve for moving said second control valve into said second position when said accelerator occupies its full load position.

8. In combination in a hydrostatic transmission with infinitely variable transmission ratio, which includes a centrifugal governor with adjustable rated speed for controlling a hydraulic adjusting mechanism for adjusting said transmission ratio: an input shaft, an output shaft, two hydraulic units each having two chambers respectively alternately acting as pressure and suction chamber, the respective chambers acting as pressure chambers being interconnected and the respective chambers acting as suction chambers being interconnected, a planetary gear transmission interposed between said input shaft and said hydraulic units for distributing the input power on one hand to one of said hydraulic units and said output shaft and on the other hand to said other hydraulic unit, a mechanical clutch interposed between said input shaft and said output shaft for direct transfer of power from said input shaft to said output shaft, said clutch including first clutch means and second clutch means adapted selectively to engage or disengage each other for respectively making said clutch effective or ineffective, actuating means operable to bring said first and second clutch means into engagement with each other, valve means interposed between the respective pressure chambers and between the respective suction chambers for selectively and respectively interconnecting the respective pressure chambers and the respective suction chambers, said valve means including a differential piston, spring means acting on the smaller surface area of said differential piston and continuously urging said valve means into position for respectively interconnecting the respective pressure chambers and the respective suction chambers, a speed responsive valve for controlling the flow of fluid to said transmission ratio adjusting mechanism, a pressure fluid source, additional valve means interposed between said pressure fluid source and said speed responsive valve for controlling the flow of fluid from said fluid source to said speed resposive valve, spring means continuously urging said additional valve means into position for effecting fluid communication between said fluid source and said speed responsive valve and conduit means effecting communication between said additional valve means on one hand and the smaller surface area of said differential piston and said actuating means on the other hand.

References Cited in the file of this patent

UNITED STATES PATENTS

| | | |
|---|---|---|
| 2,051,187 | Strigle | Aug. 18, 1936 |
| 2,257,724 | Bennetch | Oct. 7, 1941 |
| 2,485,126 | Wood | Oct. 18, 1949 |
| 2,499,071 | Mallory | Feb. 28, 1950 |
| 2,599,814 | Cull | June 10, 1952 |
| 2,688,886 | Flynn | Sept. 14, 1954 |